United States Patent [19]

Saether et al.

[11] Patent Number: 5,333,315
[45] Date of Patent: Jul. 26, 1994

[54] SYSTEM OF DEVICE INDEPENDENT FILE DIRECTORIES USING A TAG BETWEEN THE DIRECTORIES AND FILE DESCRIPTORS THAT MIGRATE WITH THE FILES

[75] Inventors: Christian D. Saether, Seattle; Peter Stoppani, Jr., Woodinville, both of Wash.

[73] Assignee: Digital Equipment Corporation, Maynard, Mass.

[21] Appl. No.: 722,008

[22] Filed: Jun. 27, 1991

[51] Int. Cl.⁵ ............................................. G06F 15/40
[52] U.S. Cl. .................................. 395/600; 395/575; 395/650; 364/DIG. 1; 364/228.81
[58] Field of Search ............... 395/600, 650, 425, 325, 395/575, 200; 364/550; 371/40.1

[56] References Cited

U.S. PATENT DOCUMENTS

| | | | |
|---|---|---|---|
| 4,403,286 | 9/1983 | Fry et al. | 395/600 |
| 4,633,387 | 12/1986 | Hartung et al. | 395/650 |
| 4,635,189 | 1/1987 | Kendall | 395/600 |
| 4,771,375 | 9/1988 | Beglin et al. | 395/425 |
| 4,843,575 | 6/1989 | Crane | 364/550 |
| 4,901,231 | 2/1990 | Bishop et al. | 395/325 |
| 4,993,030 | 2/1991 | Krakauer et al. | 371/40.1 |
| 5,032,979 | 7/1991 | Hecht et al. | 395/575 |
| 5,053,948 | 10/1991 | DeClute et al. | 395/600 |
| 5,131,087 | 7/1992 | Warr | 395/425 |
| 5,163,131 | 11/1992 | Row et al. | 395/200 |
| 5,193,171 | 3/1993 | Shinmura et al. | 395/425 |
| 5,218,696 | 6/1993 | Baird et al. | 395/600 |
| 5,237,682 | 8/1993 | Bendert et al. | 395/600 |
| 5,239,647 | 8/1993 | Anglin et al. | 395/600 |
| 5,257,369 | 10/1993 | Skeen et al. | 395/650 |
| 5,276,867 | 1/1994 | Kenley et al. | 395/600 |
| 5,276,876 | 1/1994 | Coleman et al. | 395/650 |

OTHER PUBLICATIONS

Grehan, "Directory Assistance", BYTE, Jun. 1989, pp. 327–336.
Shaw et al., UNIX Internals, Chapters 6–9, pp. 75–106, Windcrest Books, 1987.

Primary Examiner—Thomas C. Lee
Assistant Examiner—Wayne Amsbury
Attorney, Agent, or Firm—Flehr, Hohbach, Test, Albritton & Herbert

[57] ABSTRACT

A computer file system, having a multiplicity of distinct disk storage devices, includes a multiplicity of file directories, stored on various disks. Each file directory is used to translate file names into corresponding tag values. For each disk there is a file descriptor table with a file descriptor entry for every file stored on the disk. A single tag directory contains one tag entry for every file stored in the system. The tag directory is used by the file system to find a file by translating a tag value into a pointer to the disk on which the file is stored and a pointer to the file's file descriptor entry. To move a file from a first disk to a second disk, the file is copied to the second disk, a new file descriptor entry for the copied file is generated in the file descriptor table for the second disk, the copy of the file on the first disk is deallocated, and the tag entry for the file is updated to point to the second disk and to the file's new file descriptor entry. Thus, a file can be moved from a first disk a second without having to locate and update all the corresponding file directory entries. In a preferred embodiment, the file system includes a routine that monitors disk loading and unused disk capacity. It determines when disk usage is imbalanced and automatically moves files among the disks so as to better balance disk usage.

16 Claims, 4 Drawing Sheets

FIGURE 1

PRIOR ART

SYSTEM OF DEVICE INDEPENDENT FILE DIRECTORIES USING A TAG BETWEEN THE DIRECTORIES AND FILE DESCRIPTORS THAT MIGRATE WITH THE FILES

The present invention relates generally to data storage management on computer systems having multiple storage devices, and particularly to a file directory system and method for enabling files to be redistributed among the computer system's storage devices in a manner that is transparent to the computer system's users.

BACKGROUND OF THE INVENTION

Large, commercial computer systems (sometimes called data centers) typically have many types of data storage devices. Such data storage devices include solid state disks (RAM disks), cheap and slow magnetic disks, expensive and fast magnetic disks, striped disks, shadowed disks, optical disks, tape drives, and so on.

When a file is created in a computer system having multiple disks, the computer's file system selects a disk on which to store the file. In prior art systems, once a file is created and stored on one of the file system's disks, it is permanently bound to that disk until it is deleted. In other words, the file is device-dependent. This does not efficiently utilize the file system's disks. For example, some disks will be come full while others are nearly empty. The system administrator must take explicit and disruptive actions to redistribute the files among the system's disks. This may require copying (and renaming) files, or re-initializing the file system.

As another example of a problem associated with the prior art file systems, some disks can become very active while others have almost no activity. This happens when the most commonly used files are allocated to one or a few disks in the file system, while the remaining disks contain old and infrequently used files. Again the system administrator must take explicit and disruptive actions to redistribute the files among the system's disks.

Current UNIX ™ file systems can span, or support, only a single volume, or even just a portion of one volume. A volume can be one or more physical disks, but the file system treats a multi-disk volume as a single large disk. Therefore, UNIX file systems technically span only one disk, which means that UNIX file systems utilize disk storage just as poorly, if not worse than, file systems that span multiple disks and allocate files in a device-dependent manner.

The present invention solves these problems by allowing a file system to easily, transparently (i.e., users and applications are not aware of file movement) and automatically redistribute files among its disks. To transparently move files among several disks, the file system of the present invention allocates files in a device-independent manner.

SUMMARY OF THE INVENTION

In summary, the present invention is a file system for a computer having a multiplicity of distinct disk storage devices. The file system includes a multiplicity of file directories, stored on various disks. Each file directory is used to translate file names into corresponding tag values. For each disk there is a file descriptor table with a file descriptor entry for every file stored on the disk. A single tag directory contains one tag entry for every file stored in the system.

A tag directory is used by the file system to find a file by translating a tag value into a pointer to the disk on which the file is stored and a pointer to the file's file descriptor entry. To move a file from a first disk to a second disk, the file is copied to the second disk, a new file descriptor entry for the copied file is generated in the file descriptor table for the second disk, the copy of the file on the first disk and its file descriptor entry are de-allocated, and the tag entry for the file is updated to point to the second disk and to the file's new file descriptor entry. Thus, a file can be moved from a first disk to a second without having to locate and update all the corresponding file directory entries.

In a preferred embodiment, the file system includes a routine that monitors disk loading and unused disk capacity. It determines when disk usage is imbalanced and automatically moves files among the disks so as to better balance disk usage.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
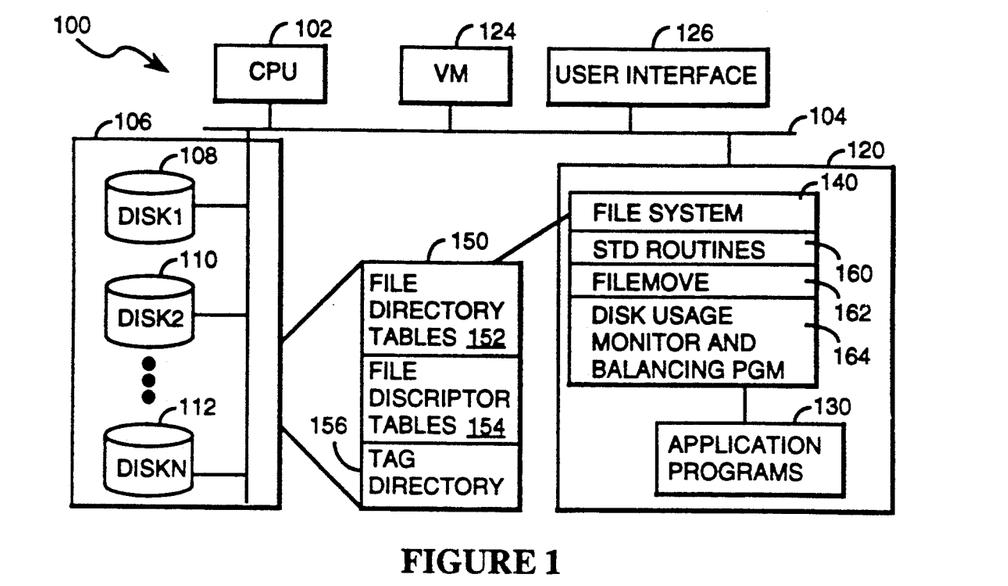
FIG. 1 is a block diagram of a computer system with multiple data storage devices and a file management system.

Referring to FIG. 1, there is shown a computer system 100 having a central processing unit 102 which is interconnected by system bus 104 to secondary memory 106 (which comprises magnetic disk storage devices 108-112), primary memory 120 (i.e., high speed, random access memory), virtual memory manager 124, and one or more user interfaces 126. Stored in primary memory 120 are currently executing application programs 130, as well as operating system software, such as the computer's file system 140 (sometimes called the file manager program).

Data structures 150 concerning disk storage that are maintained by the file system 140 include numerous file directory tables 152, file descriptor tables 154 (one per logical disk volume), and a tag directory 156, which is a new data structure introduced by the present invention. The data structures 150 are stored in secondary memory 106. In particular, the system can contain a virtually unlimited number of file directories 152, which tend to be stored more or less randomly throughout the disks of secondary memory. File directories 152 are created by the system's users, at their convenience, for grouping sets of disk files. Users access existing files by referencing a file name in a specified file directory 152. The user's request is passed to the file system 140, which determines where in secondary storage 106 the specified file is located and then either opens the file or performs some other specified task, such as making a copy of the file, printing the file, deleting the file, etc.

As will be described below, each disk 108–112 has a file descriptor table 154 containing an entry for each file stored on that disk. Finally, there is just one tag directory 156 in the system, which is usually stored on a single disk, although in one preferred embodiment there is a "secondary" portion of the tag directory 156 which can be split off and stored elsewhere.

The file system 140 includes a modified set of routines 160 for such normal file system tasks as allocating disk space to files, opening and closing existing files, and so on. In addition, the file system 140 of the present invention includes a file moving program 162, and a "disk usage monitor and balancing program" 164. The file moving program 162 moves a specified file from one disk to another. The usage monitor and balancing program 164, which will be described in more detail below, monitors the fullness of the system's disk storage devices 106–110 and their relative levels of disk input/output activity. Based on the observed disk usage, imbalances in usage that adversely affect system performance are automatically corrected by moving files from one disk storage device to another, transparently to the users of the system 100.

SINGLE LEVEL FILE LOOKUP

Figure 2:
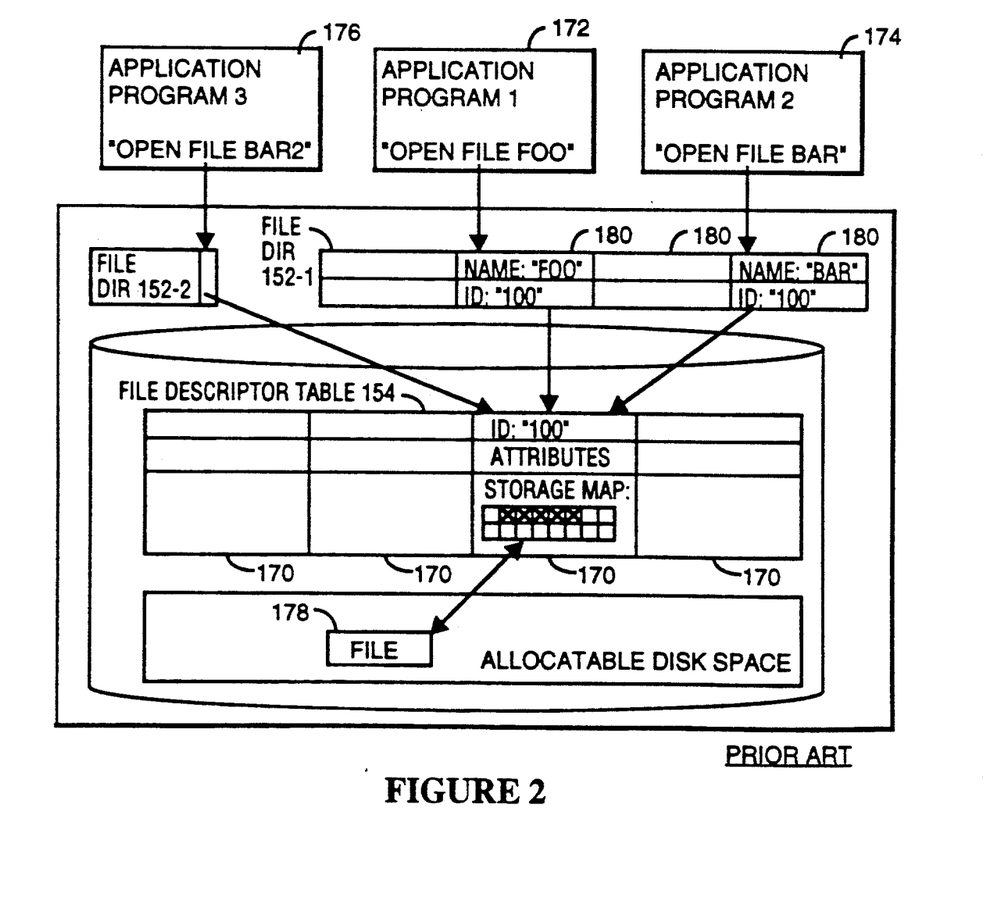
FIG. 2 is a conceptual block diagram of a prior art, single-level file lookup system.

Referring to FIG. 2, most current file systems use a single-level file lookup mechanism for locating files in a file system. These file systems use file directories 152 to translate file names to a unique file identifier or disk address, which can be used to locate the file's descriptor 170 (also called a file header or file descriptor entry) in a table called the file descriptor table 154. Each disk or logical disk volume in the system contains its own file descriptor table 154, which is stored on disk. The file descriptor table 154 stores file descriptor entries 170 which describe each file stored on that particular disk or logical disk volume. Each file descriptor entry 170 defines a file's attributes and contains a storage map or its equivalent.

Note that a "logical disk volume" may contain more than one physical disk, but is treated by the computer system for memory storage purposes as a single disk drive. For the purposes of this document, the terms "disk" and "disk storage device" shall mean any logical disk volume, regardless of whether that logical volume is one physical disk or many.

As shown in FIG. 2, two or more application programs 172–176, typically running in distinct processes, can have access to a single file 178 either at the same time or at different times. Furthermore, each program or process can use a different name for the same file. For each such file name, there is a distinct directory item 180 in one of the computer system's file directories 152. However, there is only one file descriptor 170 for each file, and thus two or more file directory entries may point to the same file descriptor 170. Such file sharing is quite common.

A problem with the single level lookup mechanism shown in FIG. 2 is that it makes it difficult to move a file to a different disk. There are two ways that such a file system could move a file. In the first method, it would allocate a new file descriptor on the new disk and copy the file and the contents of the old file descriptor 170 to the new disk. Then the file system would delete the old file descriptor and update the file directory 152 on the old disk so that it points to the new descriptor. The problem with this approach is that many file systems support multiple directory entries per file, as shown in FIG. 2. This means that the file system would either have to exhaustively search all the file directories 152 in the entire computer system for all possible entries that belong to the moved file, which is simply not viable in large computer systems that have hundreds or thousands of file directories, or it would somehow have to keep track of all directory entries 180 for each file, which is a nontrivial problem.

A second method of moving a file to another disk, starts out with the same initial step: allocate a new file descriptor on the new disk and copy the file and the contents of the old file descriptor 170 to the new disk. Then, the file system would modify the old file descriptor 170 so that it points to the new disk. The problem with this approach is that it clutters the system's disks with "forwarding address" file descriptors. In other words, the file descriptor table 154 for one disk may end up containing many entries 170 which contain forwarding addresses to other disks. This wastes disk storage space and makes it nearly impossible to remove a disk from the file system, because the file descriptor entries 170 with forwarding addresses are needed to locate all the files that were formerly stored on the disk.

Thus, one of the major deficiencies of current file systems is that they permanently bind a file to a particular disk until the file is deleted.

TWO LEVEL FILE LOOKUP

Figure 3:
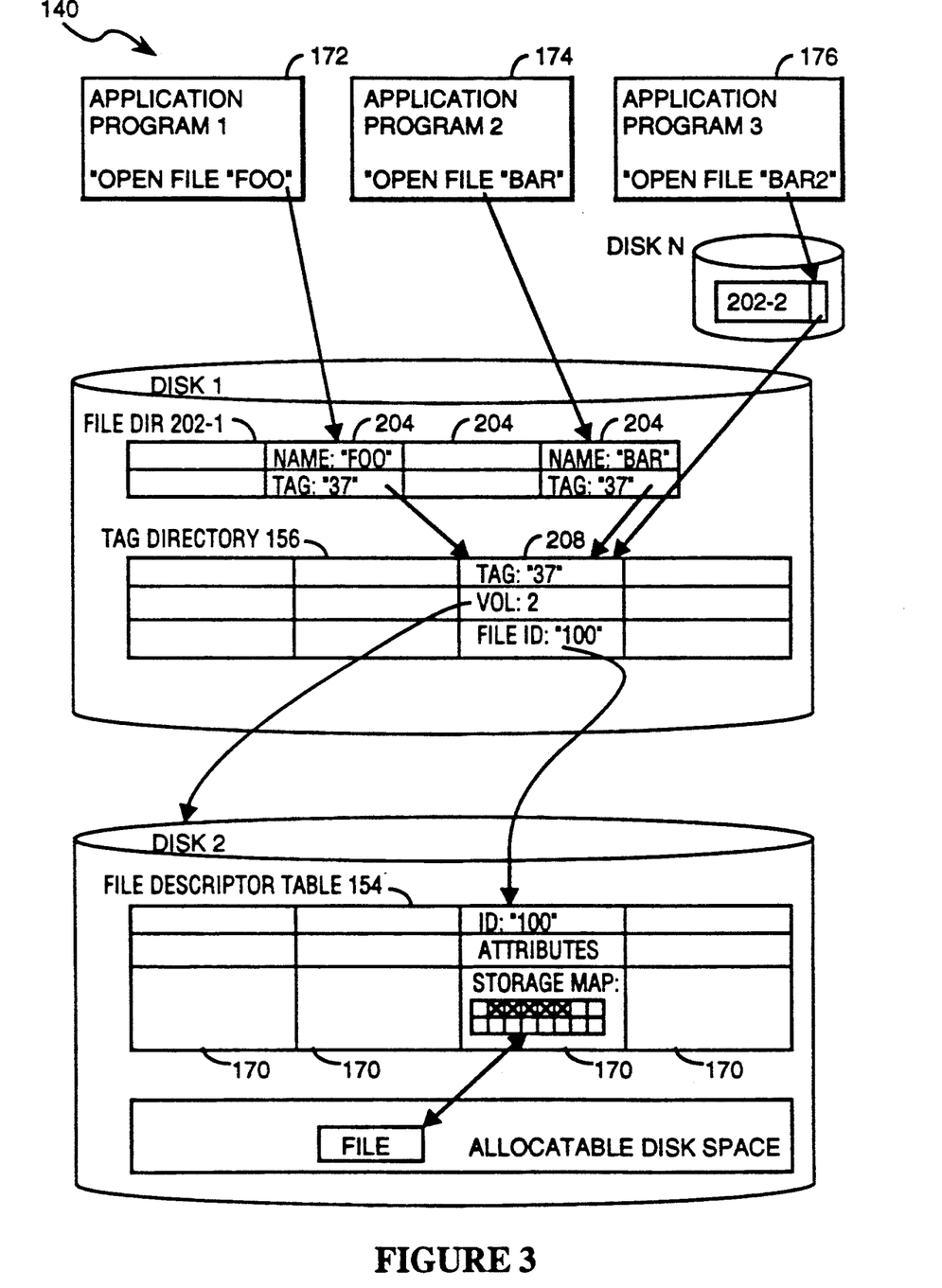
FIG. 3 is a conceptual block diagram of a two-level file lookup system in accordance with the present invention.

Referring to FIG. 3, the file system 140 of the present invention adds another level into the file lookup mechanism so that the file system can support device-independent files. The preferred embodiment does this by adding a Tag Directory between the File Directory and the File Descriptor Table.

The file system 140 uses modified file directories 202-1, 202-2, with modified file directory entries 204, to translate a file name into an identifier herein called a tag, which points to a tag entry 208 in tag directory 156. In other words, the file directory entries 204 in the present invention contain a tag value instead of a pointer to a file descriptor entry.

There is only one tag directory 156 for the entire file system 140, regardless of the number of disks in the file system. The location of the tag directory 156 in secondary storage is maintained by the file system 140. If a file has multiple directory entries 204, then all the directory entries contain the same tag value. The file system uses the tag directory 156 to translate the tag value (found in the file directories) into a disk address for an entry into the descriptor table 154 on a specified disk. This translation is performed simply by finding the tag entry 208 corresponding to the specified tag value, and then retrieving the disk identifier and file descriptor index value stored in that tag entry 208. Thus, each tag entry 208 identifies both the disk on which the file is stored, and references a file descriptor 170 which specifically locates the file on that disk.

Figure 4:
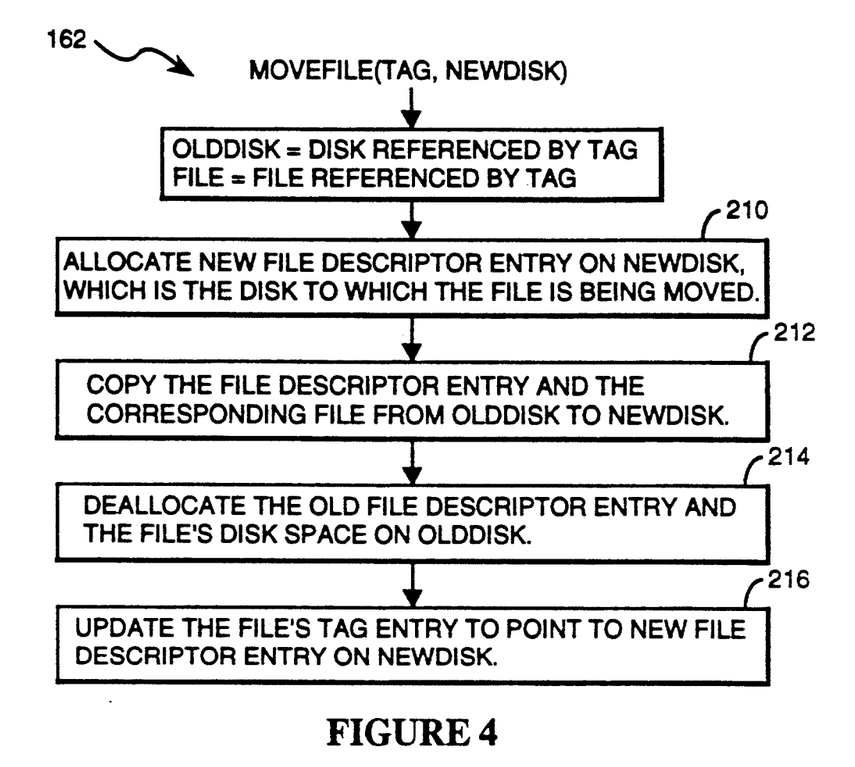
FIG. 4 is a flow chart depicting movement of a file from one disk to another disk in accordance with the present invention.

Referring to FIG. 4, using the above described lookup mechanism, the file system's file moving routine 162 moves a specified file to another disk using the following steps (not necessarily in this order):

A. Allocate a new file descriptor entry on the new disk, i.e., the disk to which the file is being moved (step 210).

B. Copy the file and the file descriptor entry from the old disk to the new disk (step 212).

C. De-allocate the old file descriptor entry and the file's disk space (step 214).

D. Update the file's tag entry so that it points to the new file descriptor entry (step 216).

Typically, as in any large computer system, transactional log entries will be created by the file system during this process so that the system can recover, without data loss, from a system crash during any point of the above described file moving process. Such transaction recovery techniques are not part of the present invention and are well known to those skilled in the art. The tag directory 156 mechanism of the present invention provides a single item that needs to be updated when a file is moved, as opposed to updating multiple file directory entries as required by previous file systems. Also, if the disk that contains the tag directory 156 needs to be removed from the file system, or if the tag directory 156 needs to be relocated for any other reason, the tag directory 156 can be moved to another disk. The tag directory is simply copied to a new disk, and the tag directory location (maintained by the file system) is updated accordingly.

Figure 5:
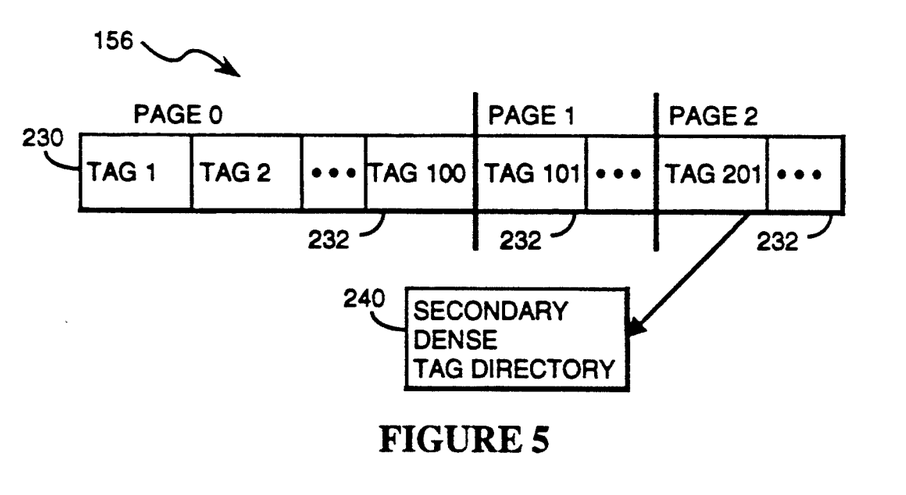
FIG. 5 is a block diagram of the tag directory data structure.

Referring to FIG. 5, the tag directory 156 is organized as an array 230 of pages 232, where each page 232 contains a header (not shown) and an array of tag pointers. Logically, the tag directory 156 is simply an array of tag entries where each tag entry represents a tag and entries are sorted in ascending order, starting with tag 1. Tags are allocated in ascending order and they are never reused (i.e., once a file is deleted, its tag is not reused).

The simple organization of the tag directory facilitates fast and efficient tag lookup. Given a tag to look up, one only needs to calculate the tag's page number and the tag's position within the page. The following formulas are used:

$$TAG'S\_PAGE = INTEGER\{(TAG-1)/TAGS\_PER\_PAGE)\}$$

$$TAG'S\_INDEX = (TAG-1) - TAG'S\ PAGE \times TAGS\_PER\_PAGE.$$

As files are deleted, their associated tags become invalid. Since tags are never reused, tag directory pages will, over time, contain some percentage of invalid entries that can never be reused. Eventually, some pages of the tag directory 156 will contain very few active tag entries. While pages with no valid tag entries can simply be deleted, pages with just a few active entries waste disk space for a very long period of time if the remaining tag entries belong to files that aren't deleted.

In one preferred embodiment, whenever a tag directory page 230 contains less than a specified number of valid entries (e.g., less than five valid entries for pages that hold one thousand tag entries), the remaining valid tag entries are copied to a secondary tag directory 240 and the tag directory page 230 is de-allocated. There is only one secondary tag directory 240 in the file system, and it is implemented as a dense ordered array of tag entries. In other words, there is little or no unused space in the secondary tag directory 240, avoiding wasted disk space. This can be done either by storing the tags in directory 240 in strict ascending order and using a binary search to find items, or by using a hash table to quickly locate items in the secondary tag directory 240.

The secondary tag directory 240 is accessed only when a tag is not found in the primary tag directory array 230.

The process used by the file system to locate a file when given the file's name is as follows. First it uses the file directory to translate the file name into a tag. Second, it uses the primary tag directory array 230 to translate the tag into a disk identifier and an index or pointer to the appropriate item in that disk's file descriptor table 154. Third, if the tag was not found in the primary tag directory array 230, the secondary tag directory 240 is accessed to translate the tag into a disk identifier and file descriptor item pointer.

The primary tag directory array 230 forgoes disk space utilization efficiency in order to provide fast tag lookup, whereas the secondary tag directory 240 forgoes some degree of tag lookup speed in order to improve disk space utilization.

AUTOMATIC DISK MONITORING AND FILE MOVING

Taking advantage of the present invention's ability to move files transparently (i.e., without affecting the system's users), a human system administrator can periodically review the remaining capacity of each of the file system's disks, and then move files around to balance disk capacity, thereby preventing any one disk or set of disks from running out of room. The human system administrator could also attempt to periodically monitor the load on each of the file system's disks (i.e., the rate of input/output operations to the disks), and move files so as to balance the load on various disks. Load balancing can be important because each disk arm actuator of a disk storage device can handle no more than a set number of I/O operations per second, with a typical limit being perhaps 25 I/O operations per second per disk arm. If too many of the most actively used files are located on one disk, system performance may degrade due to an input/output bottleneck at that disk.

However, once the ability to move files from one disk to another is made feasible by using the present invention, it also becomes feasible to automate the process of monitoring disk I/O loads and disk capacity and to automatically move files between disks so as to balance either disk loads or disk capacity or both.

Figure 6:
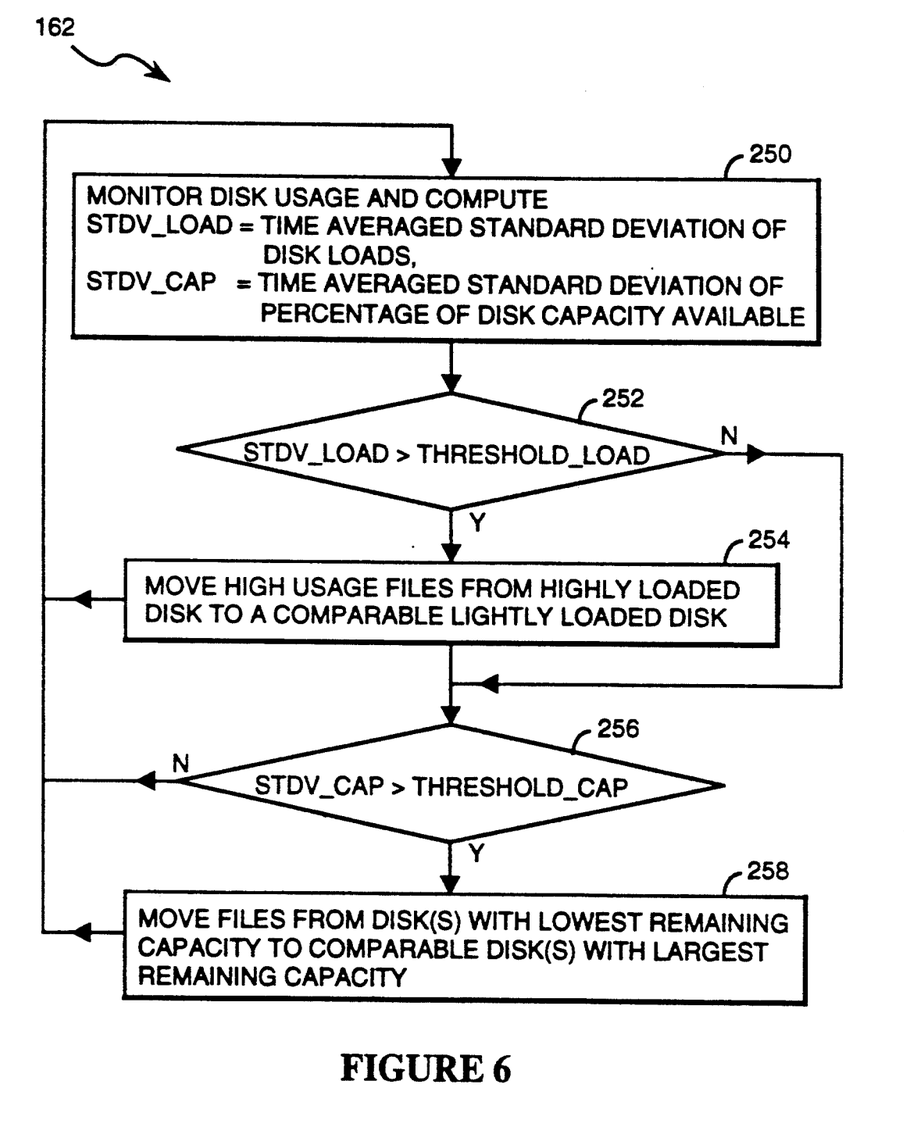
FIG. 6 is a flow chart of a disk usage monitor and balancing routine.

Referring to FIG. 6, in a preferred embodiment, the file system has a disk usage monitor and balancing routine 164 which not only monitors disk capacities and disk loads, but also computes time averaged statistical values, such as the standard deviations of these two disk usage parameters (step 250). The standard deviation values for percentage of capacity available and disk load are indicators of disparity of disk usage. It is important for these values to be time averages, or low pass filtered, so that short bursts of disk activity, or a temporary process that only briefly occupies a large amount of disk space, does not unnecessarily cause a large number of files to be relocated.

When the disk load standard deviation exceeds a corresponding preselected threshold value (step 252), which is indicative of the dividing line between acceptable and unacceptable system performance, the program 164 moves files from the disk that is most heavily loaded to a comparable disk (i.e., in terms of access speed, availability, etc.) which is least heavily loaded (steps 254). Similarly, when the disk capacity parameter exceeds a corresponding preselected threshold value (step 256), the program 164 moves files from a disk that has much less than average remaining capacity to a comparable disk with the largest remaining capacity (step 258). Then the process starts over again. If the disk usage is still imbalanced, more files are moved, until the computed disk usage statistics do not violate the specified threshold criteria for acceptable system performance. The number of files moved during any one iteration of this process should be kept conservatively small so as to avoid unnecessary file movement.

In other embodiments, other criteria than standard deviation of disk capacity and disk load could be used to determine when files should be relocated.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A file system for use with a computer system having a central processing unit and a multiplicity of data storage devices on which files are stored, comprising:
   a multiplicity of file directories, stored on various ones of said multiplicity of data storage devices, each file directory containing a set of file directory entries, each file directory entry having a file name and a corresponding tag value, each file having a unique tag value but a possible plurality of names; wherein multiple file directory entries stored in one or more of said file directories may contain identical tag values;
   a separate file descriptor table for each of said multiplicity of data storage devices, each of said file descriptor tables containing a file descriptor entry including file locating information for every file stored on the corresponding data storage device;
   a tag directory, stored on at least a selected one of said multiplicity of data storage devices, said tag directory containing tag entries for a defined set of tag values, wherein every file stored in said multiplicity of data storage devices is represented by a unique one of said tag entries, each said tag entry denoting the one of said multiplicity of data storage devices on which the file corresponding to said tag entry is stored; and
   file moving means, executable by said central processing unit, for moving a specified file from a first one to a second one of said multiplicity of data storage devices, including means for copying said specified file to said second one of said multiplicity of data storage devices, generating a file descriptor entry for said copied file on said file descriptor table for said second one of said multiplicity of data storage devices, changing the tag entry in said tag directory corresponding to said specified file so that said tag entry denotes said second one of said multiplicity of data storage devices, and initiating deallocation of said specified file on said first data storage device and of said specified file's file descriptor entry from said file descriptor table for said first data storage device;
   means for determining the location of a file by using one of its names to find the corresponding tag value, and from the tag value its file descriptor entry whereby a file can be moved from a first one to a second one of said multiplicity of data storage devices without having to locate and update all corresponding file directory entries.

2. The file system of claim 1, further including
   data storage usage monitoring means, executable by said central processing unit, for monitoring usage of said multiplicity of data storage devices, computing corresponding statistical values indicative of whether said usage is imbalanced, comparing said computed statistical values with predefined criteria, and when said predefined criteria are met, automatically moving files among said multiplicity of data storage devices so as to better balance usage thereof.

3. The file system of claim 1, further including
   data storage usage monitoring means, executable by said central processing unit, for monitoring unused capacity on each of said multiplicity of data storage devices, computing statistical values indicative of whether said unused capacity is unevenly distributed among said multiplicity of data storage devices, comparing said computed statistical values with predefined criteria, and when said predefined criteria are met, automatically moving files among said multiplicity of data storage devices so as to more evenly distribute unused capacity among said multiplicity of data storage devices.

4. The file system of claim 3, said data storage usage monitoring means further including means for monitoring loading on each of said multiplicity of data storage devices, computing time averaged statistical values indicative of whether said loading is unevenly distributed among said multiplicity of data storage devices, comparing said computed statistical values with predefined criteria, and when said predefined criteria are met, automatically moving files among said multiplicity of data storage devices so as to more evenly distribute loading among said multiplicity of data storage devices.

5. A method of allocating storage space in a computer system having a multiplicity of data storage devices, comprising:
   storing on various ones of said multiplicity of data storage devices a multiplicity of file directories, each file directory containing a set of file directory entries, each file directory entry having a file name and a corresponding tag value, each file having a unique tag value but a possible plurality of names; wherein multiple file directory entries stored in one or more of said file directories may contain identical tag values;
   storing on each of said multiplicity of data storage devices a separate file descriptor table, each of said file descriptor tables containing a file descriptor entry including file locating information for every file stored on the corresponding data storage device,
   whereby the location of a file can be determined by using one of its names to find the corresponding tag value, and from the tag value its file descriptor entry;
   storing on at least a selected one of said multiplicity of data storage devices a tag directory containing tag entries for a defined set of tag values, wherein every file stored in said multiplicity of data storage devices is represented by a unique one of said tag entries, each said tag entry denoting the one of said multiplicity of data storage devices on which the file corresponding to said tag entry is stored; and moving a specified file from a first one to a second one of said multiplicity of data storage devices, including copying said specified file to said second one of said multiplicity of data storage devices, generating a file descriptor entry for said copied file on said file descriptor table for said second one of said multiplicity of data storage devices, changing the tag entry in said tag directory corresponding to said specified file so that said tag entry denotes said second one of said multiplicity of data storage devices, and deallocating said specified file on said first data storage device and said specified file's file descriptor entry from said file descriptor table for said first data storage device;

whereby a file can be moved from a first one to a second one of said multiplicity of data storage devices without having to locate and update all corresponding file directory entries.

6. The method of allocating storage space of claim 5, further including monitoring usage of said multiplicity of data storage devices, computing corresponding statistical values indicative of whether said usage is imbalanced, comparing said computed statistical values with predefined criteria, and when said predefined criteria are met, automatically moving files among said multiplicity of data storage devices so as to better balance usage thereof.

7. The method of allocating storage space of claim 5, further including monitoring unused capacity on each of said multiplicity of data storage devices, computing statistical values indicative of whether said unused capacity is unevenly distributed among said multiplicity of data storage devices, comparing said computed statistical values with predefined criteria, and when said predefined criteria are met, automatically moving files among said multiplicity of data storage devices so as to more evenly distribute unused capacity among said multiplicity of data storage devices.

8. The method of allocating storage space of claim 7, further including monitoring loading on each of said multiplicity of data storage devices, computing time averaged statistical values indicative of whether said loading is unevenly distributed among said multiplicity of data storage devices, comparing said computed statistical values with predefined criteria, and when said predefined criteria are met, automatically moving files among said multiplicity of data storage devices so as to more evenly distribute loading among said multiplicity of data storage devices.

9. A file system for use with a computer system having a central processing unit and a multiplicity of data storage devices on which files are stored, comprising:

a multiplicity of file directories, stored on various ones of said multiplicity of data storage devices, each file directory containing a set of file directory entries, each file directory entry having a file name and a corresponding tag value, each file having a unique tag value but a possible plurality of names;

a tag directory, stored on at least a selected one of said multiplicity of data storage devices, said tag directory containing tag entries for a defined set of tag values, wherein every file stored in said multiplicity of data storage devices is represented by a unique one of said tag entries, each said tag entry denoting the one of said multiplicity of data storage devices on which the file corresponding to said tag entry is stored;

a separate file descriptor table for each of said multiplicity of data storage devices, each of said file descriptor tables containing a file descriptor entry including file including information for every file stored on the corresponding data storage device; whereby the location of a file can be determined by using one of its names to find the corresponding tag value, and from the tag value its file descriptor entry; and file moving means, executable by said central processing unit, for moving a specified file from a first one to a second one of said multiplicity of data storage devices, including means for copying said specified file to said second one of said multiplicity of data storage devices, generating a file descriptor entry for said copied file on said file descriptor table for said second one of said multiplicity of data storage devices, changing the tag entry in said tag directory corresponding to said specified file so that said tag entry denotes said second one of said multiplicity of data storage devices, and initiating deallocation of said specified file on said first data storage device and of said specified file's file descriptor entry from said file descriptor table for said first data storage device.

10. The file system of claim 9, further including data storage usage monitoring means, executable by said central processing unit, for monitoring usage of said multiplicity of data storage devices, computing corresponding statistical values indicative of whether said usage is imbalanced, comparing said computed statistical values with predefined criteria, and when said predefined criteria are met, automatically moving files among said multiplicity of data storage devices so as to better balance usage thereof.

11. The file system of claim 9, further including data storage usage monitoring means, executable by said central processing unit, for monitoring unused capacity on each of said multiplicity of data storage devices, computing statistical values indicative of whether said unused capacity is unevenly distributed among said multiplicity of data storage devices, comparing said computed statistical values with predefined criteria, and when said predefined criteria are met, automatically moving files among said multiplicity of data storage devices so as to more evenly distribute unused capacity among said multiplicity of data storage devices.

12. The file system of claim 11, said data storage usage monitoring means further including means for monitoring loading on each of said multiplicity of data storage devices, computing time averaged statistical values indicative of whether said loading is unevenly distributed among said multiplicity of data storage devices, comparing said computed statistical values with predefined criteria, and when said predefined criteria are met, automatically moving files among said multiplicity of data storage devices so as to more evenly distribute loading among said multiplicity of data storage devices.

13. A method of allocating storage space in a computer system having a multiplicity of data storage devices, comprising:

storing on at least a selected one of said multiplicity of data storage devices a tag directory containing tag entries for a defined set of tag values, wherein every file stored in said multiplicity of data storage devices is represented by a unique one of said tag entries, each said tag entry denoting the one of said multiplicity of data storage devices on which the file corresponding to said tag entry is stored;

storing on various ones of said multiplicity of data storage devices a multiplicity of file directories, each file directory containing a set of file directory entries, each file directory entry having a file name and a corresponding tag value, each file having a unique tag value but a possible plurality of names;

storing on each of said multiplicity of data storage devices a separate file descriptor table, each file descriptor table containing a file descriptor entry including file locating information for every file stored on the corresponding data storage device; whereby the location of a file can be determined by using one of its names to find the corresponding tag value, and from the tag value its file descriptor entry; and moving a specified file from a first one to a second one of said multiplicity of data storage devices, including copying said specified file to said second one of said multiplicity of data storage devices, generating a file descriptor entry for said copied file on said file descriptor table for said second one of said multiplicity of data storage devices, changing the tag entry in said tag directory corresponding to said specified file so that said tag entry denotes said second one of said multiplicity of data storage devices, and deallocating said specified file on said first data storage device and said specified file's file descriptor entry from said file descriptor table for said first data storage device.

14. The method of allocating storage space of claim 13, further including monitoring usage of said multiplicity of data storage devices, computing corresponding statistical values indicative of whether said usage is imbalanced, comparing said computed statistical values with predefined criteria, and when said predefined criteria are met, automatically moving files among said multiplicity of data storage devices so as to better balance usage thereof.

15. The method of allocating storage space of claim 13, further including monitoring unused capacity on each of said multiplicity of data storage devices, computing statistical values indicative of whether said unused capacity is unevenly distributed among said multiplicity of data storage devices, comparing said computed statistical values with predefined criteria, and when said predefined criteria are met, automatically moving files among said multiplicity of data storage devices so as to more evenly distribute unused capacity among said multiplicity of data storage devices.

16. The method of allocating storage space of claim 15, further including monitoring loading on each of said multiplicity of data storage devices, computing time averaged statistical values indicative of whether said loading is unevenly distributed among said multiplicity of data storage devices, comparing said computed statistical values with predefined criteria, and when said predefined criteria are met, automatically moving files among said multiplicity of data storage devices so as to more evenly distribute loading among said multiplicity of data storage devices.

* * * * *